United States Patent
Griggs et al.

(10) Patent No.: US 12,189,277 B2
(45) Date of Patent: Jan. 7, 2025

(54) CAMERA MOUNT

(71) Applicant: GoPro, Inc., San Mateo, CA (US)

(72) Inventors: Ian Griggs, San Francisco, CA (US); David Thomas Platner, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 5 days.

(21) Appl. No.: 18/085,739

(22) Filed: Dec. 21, 2022

(65) Prior Publication Data

US 2023/0236479 A1 Jul. 27, 2023

Related U.S. Application Data

(60) Provisional application No. 63/303,618, filed on Jan. 27, 2022.

(51) Int. Cl.
| | |
|---|---|
| *G03B 17/56* | (2021.01) |
| *F16M 11/04* | (2006.01) |
| *F16M 11/10* | (2006.01) |
| *F16M 11/12* | (2006.01) |
| *F16M 11/18* | (2006.01) |

(52) U.S. Cl.
CPC ........... *G03B 17/561* (2013.01); *F16M 11/04* (2013.01); *F16M 11/10* (2013.01); *F16M 11/12* (2013.01); *F16M 11/18* (2013.01); *G03B 17/56* (2013.01)

(58) Field of Classification Search
CPC .............................. G03B 17/561; F16M 11/04
USPC ........................................................ 396/428
See application file for complete search history.

(56) References Cited

U.S. PATENT DOCUMENTS

| | | | | |
|---|---|---|---|---|
| 9,395,031 | B1* | 7/2016 | Clearman | F16M 13/00 |
| 10,694,083 | B1* | 6/2020 | Thomas | G03B 17/08 |
| 11,245,818 | B2* | 2/2022 | Thomas | H04N 23/51 |
| 11,641,528 | B2* | 5/2023 | Douady | H04N 23/698 |
| | | | | 348/241 |
| 11,721,712 | B2* | 8/2023 | Vitale | G02B 7/022 |
| | | | | 348/360 |
| 11,849,248 | B2* | 12/2023 | Chinnaiyan | H04N 5/772 |
| 11,882,351 | B2* | 1/2024 | Santos | H04N 23/665 |
| 2018/0157153 | A1* | 6/2018 | Clearman | G03B 17/561 |
| 2020/0142285 | A1* | 5/2020 | Clearman | G03B 17/566 |
| 2020/0220996 | A1* | 7/2020 | Thomas | G03B 17/08 |
| 2021/0021738 | A1* | 1/2021 | Thomas | G03B 17/56 |
| 2021/0111210 | A1* | 4/2021 | Vitale | G02B 3/0075 |
| 2021/0112182 | A1* | 4/2021 | Crow | H04N 23/665 |
| 2021/0306536 | A1* | 9/2021 | Vitale | H04N 23/51 |
| 2022/0291573 | A1* | 9/2022 | Hilliard | G03B 17/566 |

(Continued)

FOREIGN PATENT DOCUMENTS

| | | | | | |
|---|---|---|---|---|---|
| CN | 218830398 | U * | 4/2023 | ............. | G02B 7/003 |
| CN | 218996373 | U * | 5/2023 | ............. | H04N 23/51 |

(Continued)

*Primary Examiner* — Stephanie E Bloss
*Assistant Examiner* — Kevin C Butler
(74) *Attorney, Agent, or Firm* — Young Basile Hanlon & MacFarlane, P.C.

(57) ABSTRACT

A camera mount, comprising: a body, one or more magnets, and one or more pins. The one or more magnets located within the body and configured to connect to a magnetic portion or a ferromagnetic portion of a camera. The one or more pins that extend axially outward from the body above the one or more magnets and are configured to extend into recesses within the camera.

20 Claims, 11 Drawing Sheets

(56) References Cited

U.S. PATENT DOCUMENTS

| | | | |
|---|---|---|---|
| 2023/0057637 A1* | 2/2023 | Krishnamurthy | H04N 23/661 |
| 2023/0236479 A1* | 7/2023 | Griggs | G03B 17/566 |
| | | | 396/428 |
| 2023/0283868 A1* | 9/2023 | Crow | H04N 23/54 |
| | | | 348/374 |
| 2023/0324772 A1* | 10/2023 | Russell | G03B 17/561 |
| | | | 396/428 |
| 2023/0324774 A1* | 10/2023 | Muhlenkamp, IV | G03B 17/04 |
| | | | 396/428 |
| 2023/0326943 A1* | 10/2023 | Vitale | H04N 23/45 |
| | | | 348/360 |
| 2023/0328432 A1* | 10/2023 | Tisch | G10L 21/0272 |
| | | | 381/92 |

FOREIGN PATENT DOCUMENTS

| | | | | |
|---|---|---|---|---|
| CN | 219697778 U | * | 9/2023 | G03B 17/14 |
| DE | 202022106684 U1 | * | 4/2023 | G03B 17/14 |
| GB | 2546075 A | * | 7/2017 | F16M 11/041 |

* cited by examiner

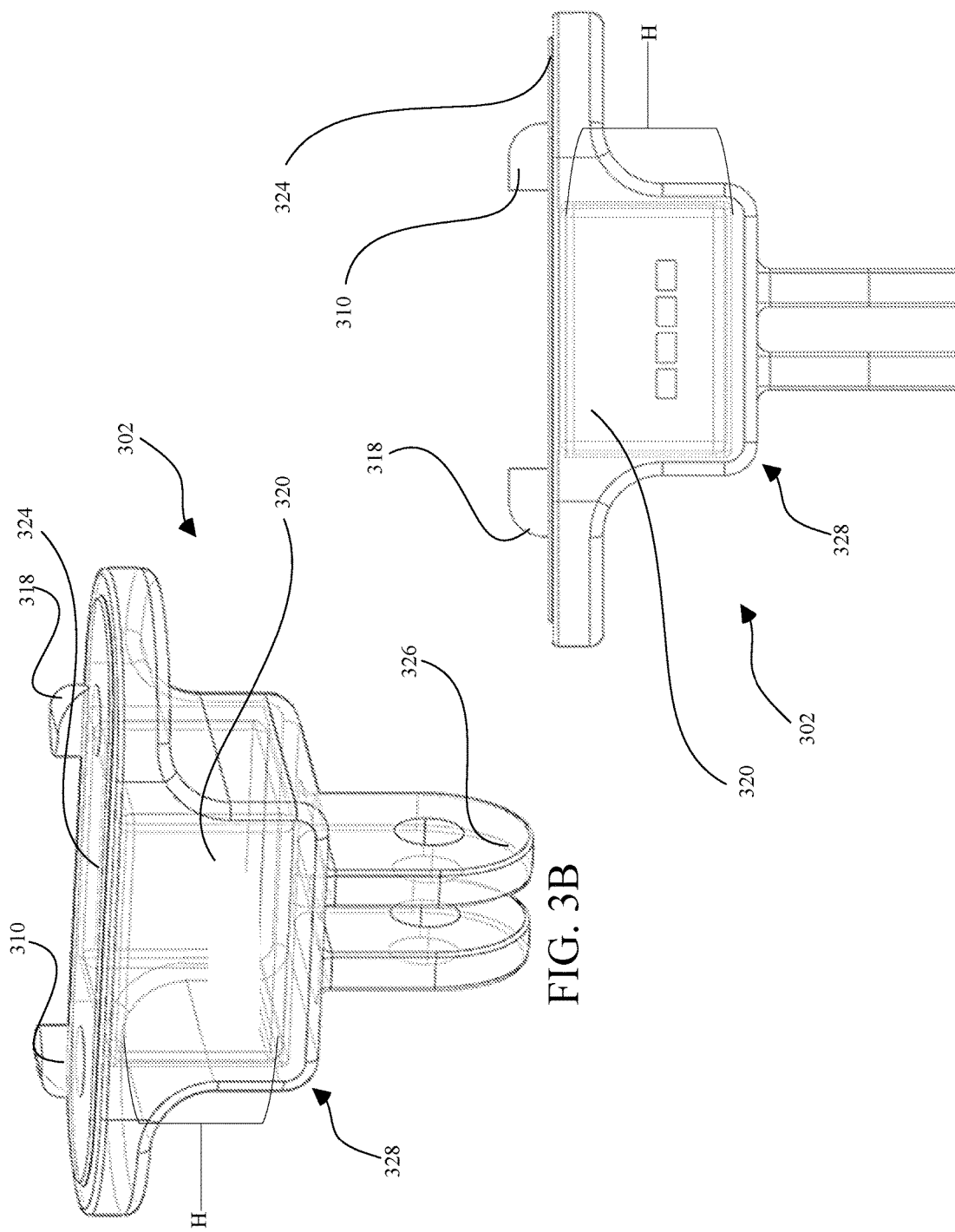

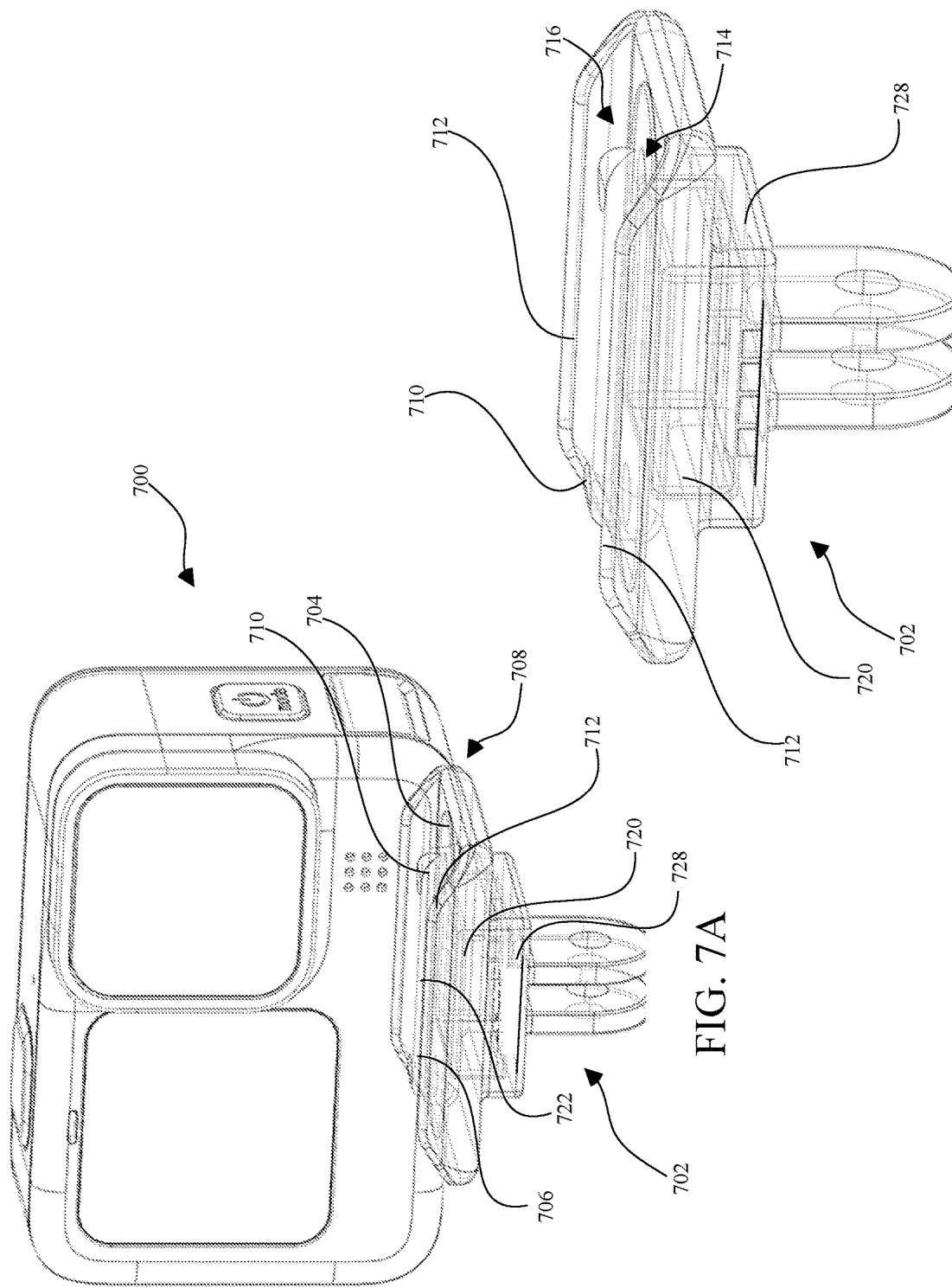

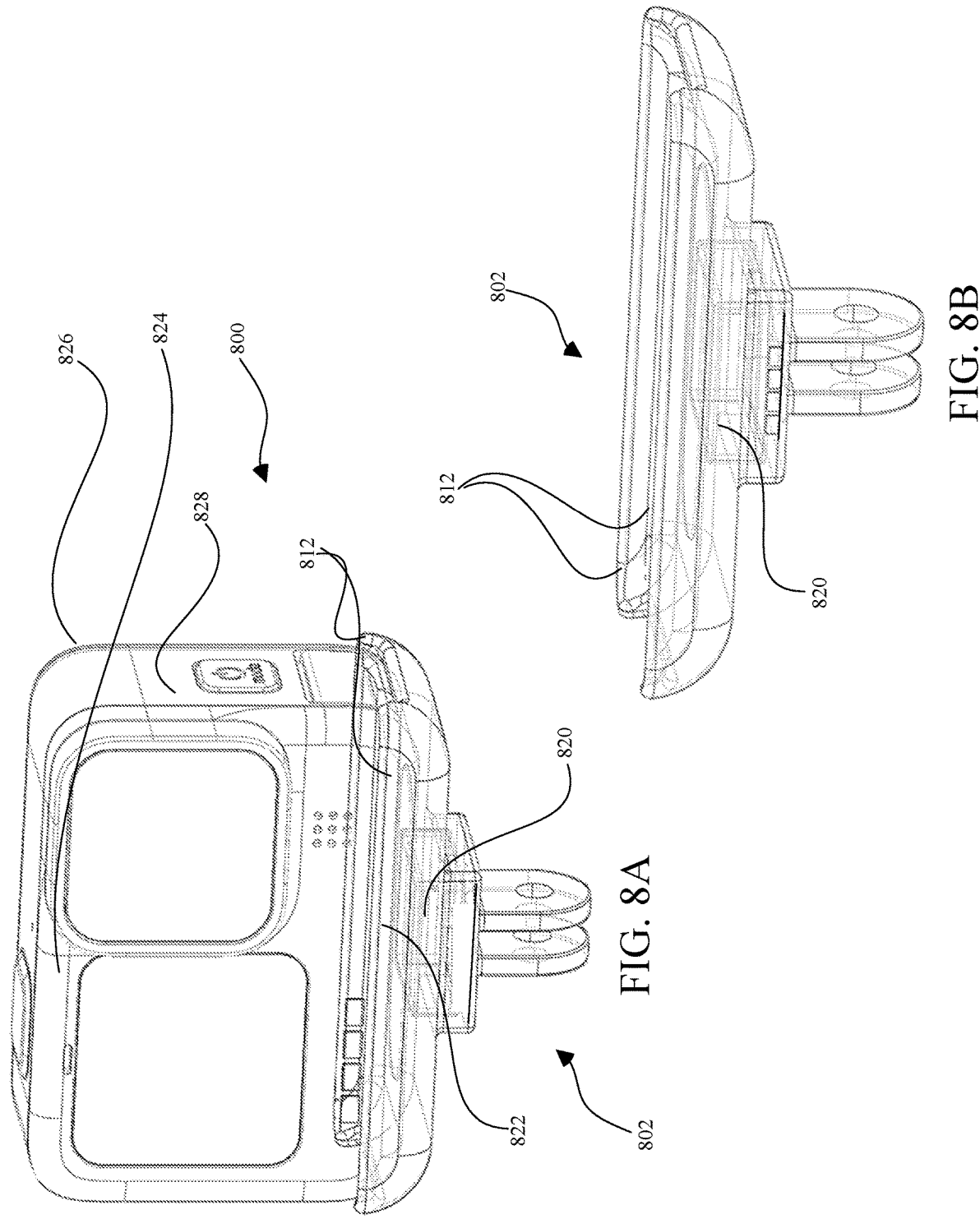

CAMERA MOUNT

CROSS-REFERENCE TO RELATED APPLICATION(S)

This application claims priority to and the benefit of U.S. Provisional Application Patent Ser. No. 63/303,618, filed Jan. 27, 2022, the entire disclosure of which is hereby incorporated by reference.

TECHNICAL FIELD

This disclosure relates to a camera mount that provides a quick connection to a camera where the quick connection includes magnets that releasably engage the camera to prevent the camera from disengaging from the camera mount.

BACKGROUND

Generally, image capture devices are available that are capable of capturing both images and videos. These image capture devices may be set up at a location to capture an event over a period of time. The camera is connected to a mount that supports the camera so that the camera can capture the event. The mounts that support the camera generally connect to the camera to prevent the camera from disconnecting from the mount. This connection may take several section to release such that in an action environment a shot may be missed trying to move the camera between locations, mounts, or both.

SUMMARY

Disclosed herein are implementations of a camera mount that connects and supports a camera relative to a structure. The teachings herein provide a camera mount that mounts a camera to a structure and quick releases the camera. The quick release is performed without any tools or manipulating any parts of the camera, the camera mount, or both. The camera mount resists shear forces (e.g., a force parallel to a face of the camera) such that the camera may only be removed by a force that is perpendicular to a face of the camera mount.

The present teachings provide a camera mount, comprising: a body, one or more magnets, and one or more pins. The one or more magnets located within the body and configured to connect to a magnetic portion or ferromagnetic portion of a camera. The one or more pins that extend axially outward from the body above the one or more magnets and are configured to extend into recesses within the camera.

The present teachings provide a camera mount comprising: a body, one or more magnets, and an outer surface. The one or more magnets located partially or entirely within the body and configured to connect the camera mount to a camera. The outer surface extending between the magnets and the camera, the outer surface configured to prevent the magnets from disconnecting from the camera when a shear force is generated against the camera mount or the camera.

The present teachings provide a camera mount comprising: a body, one or more magnets, and mount interconnect mechanisms. The body is configured to have a portion that extends partially or entirely into a recess in a camera to prevent the camera from being slidingly movable relative to the camera mount. The one or more magnets located partially or entirely within the body, the one or more magnets generating a magnetic force that secures the camera mount to the camera. The mount interconnect mechanisms extend from the body that are configured to connect the camera, the camera mount, or both to another support device.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3B is a partially transparent isometric view of the camera mount of FIG. 3A.

FIG. 3C is a partially transparent front view of the camera mount of FIG. 3B.

FIG. 7A is a partially transparent isometric view of a camera and a camera mount.

FIG. 7B is a partially transparent isometric view of the camera mount of FIG. 7A.

FIG. 8A is a partially transparent isometric view of a camera and a camera mount.

FIG. 8B is a partially transparent isometric view of the camera mount of FIG. 8A.

DETAILED DESCRIPTION

The present teachings provide a camera mount configured to support an image capture device that captures videos and audio related to the video. The camera mount is a quick release camera mount that does not require any tools or manipulation of the camera or camera mount to release the camera from the camera mount. The camera mount may resist and/or prevent the camera from being removed in a direction parallel to a face of the camera mount (e.g., a shear removal). The camera mount may support the camera such that the camera resists a shock, being oriented upside down, held at a downward angle relative to the ground (e.g., a 45 degree angle), or a combination thereof.

Figure 1A:
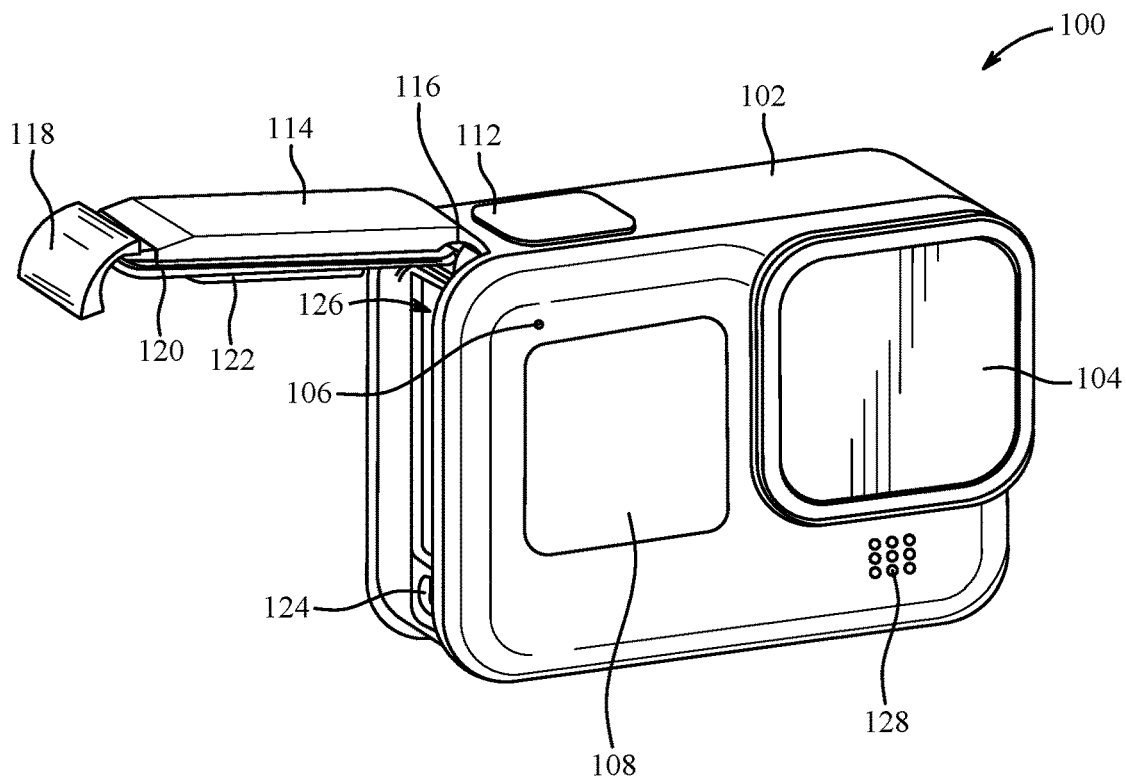
FIGS. 1A-B are isometric views of an example of an image capture device.
Figure 1B:
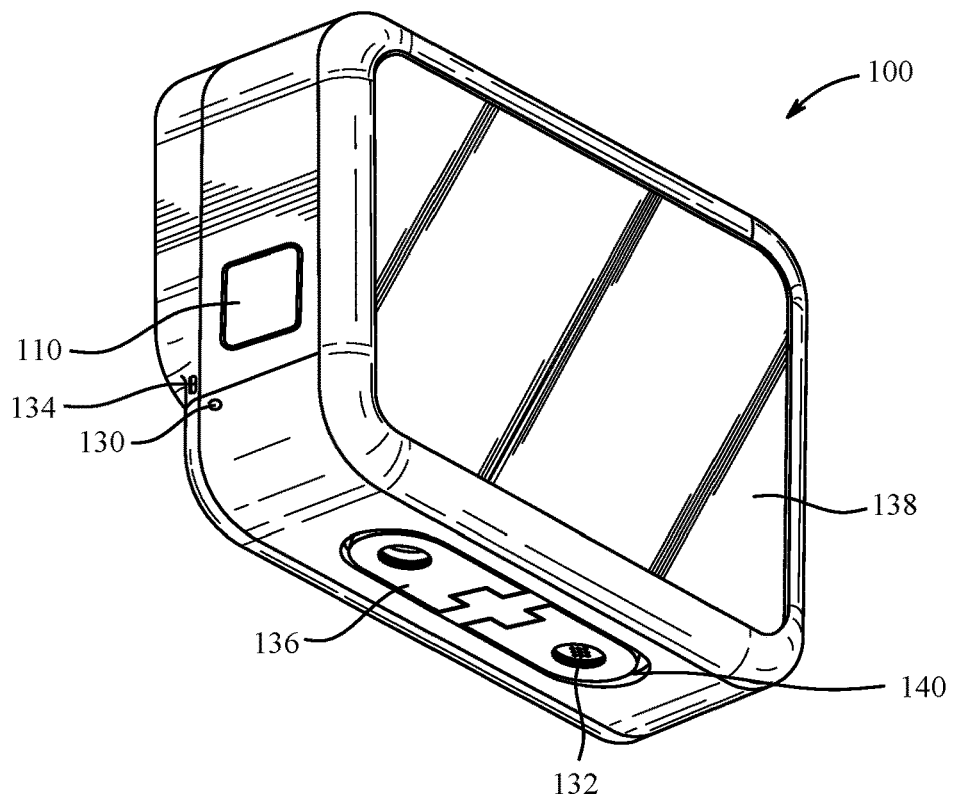

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

A bottom surface of the image capture device 100 includes the interconnect mechanism 136. When the interconnect mechanism 136 is stowed as shown interconnect recesses 140 are formed at opposing ends of the interconnect mechanism 136. The interconnect recesses 140 have a complementary shape to a shape of the interconnect mechanism 136. The shape of the interconnect recesses 140 may be crescent shaped, half circular, "U" shaped, "C" shaped, a generally round shape, or a combination thereof.

Figure 2:
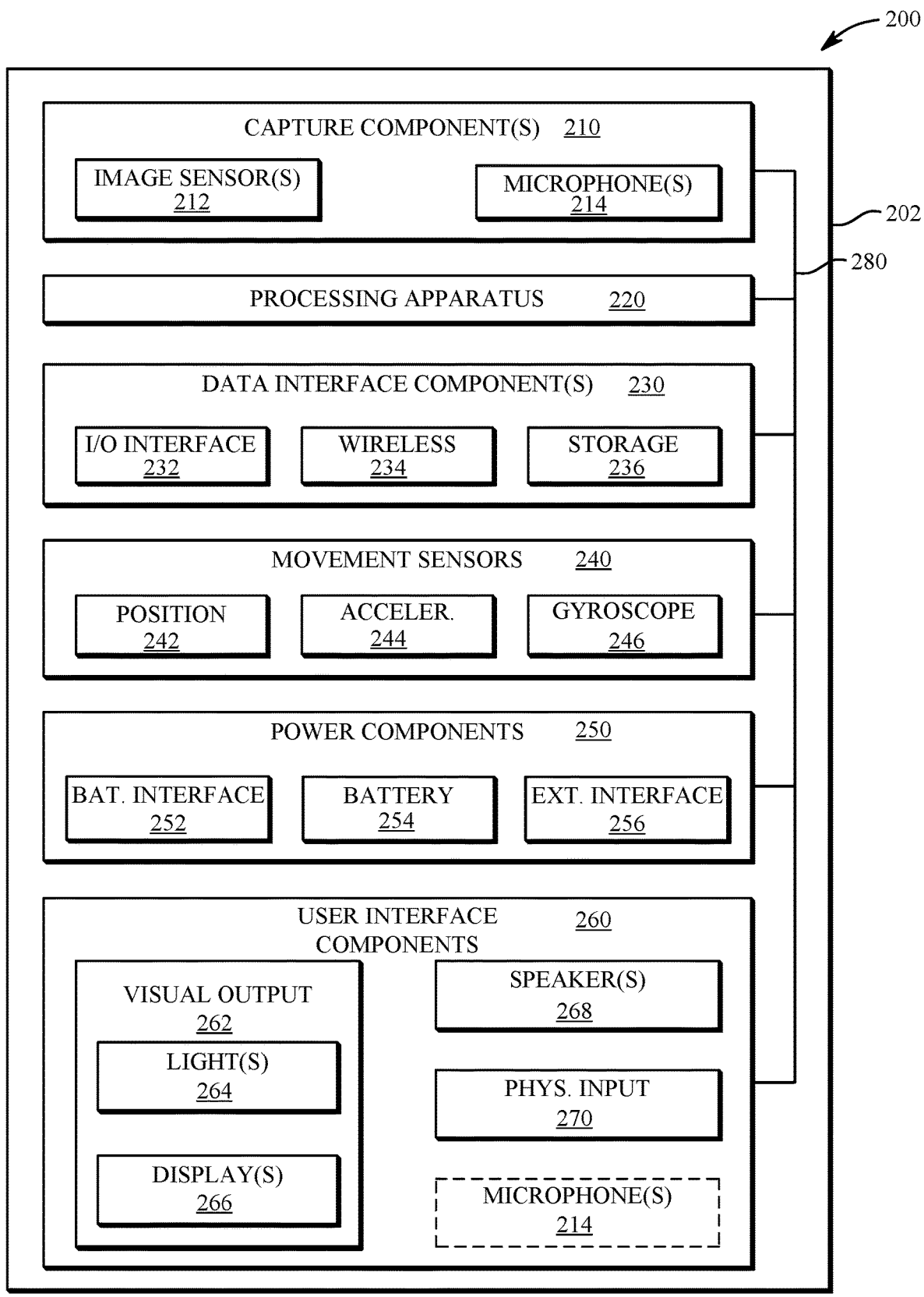
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

The image capture devices 100 or 200 of FIGS. 1A-2 may be connected to any camera mounts illustrated in FIGS. 3A-9B.

Figure 3A:
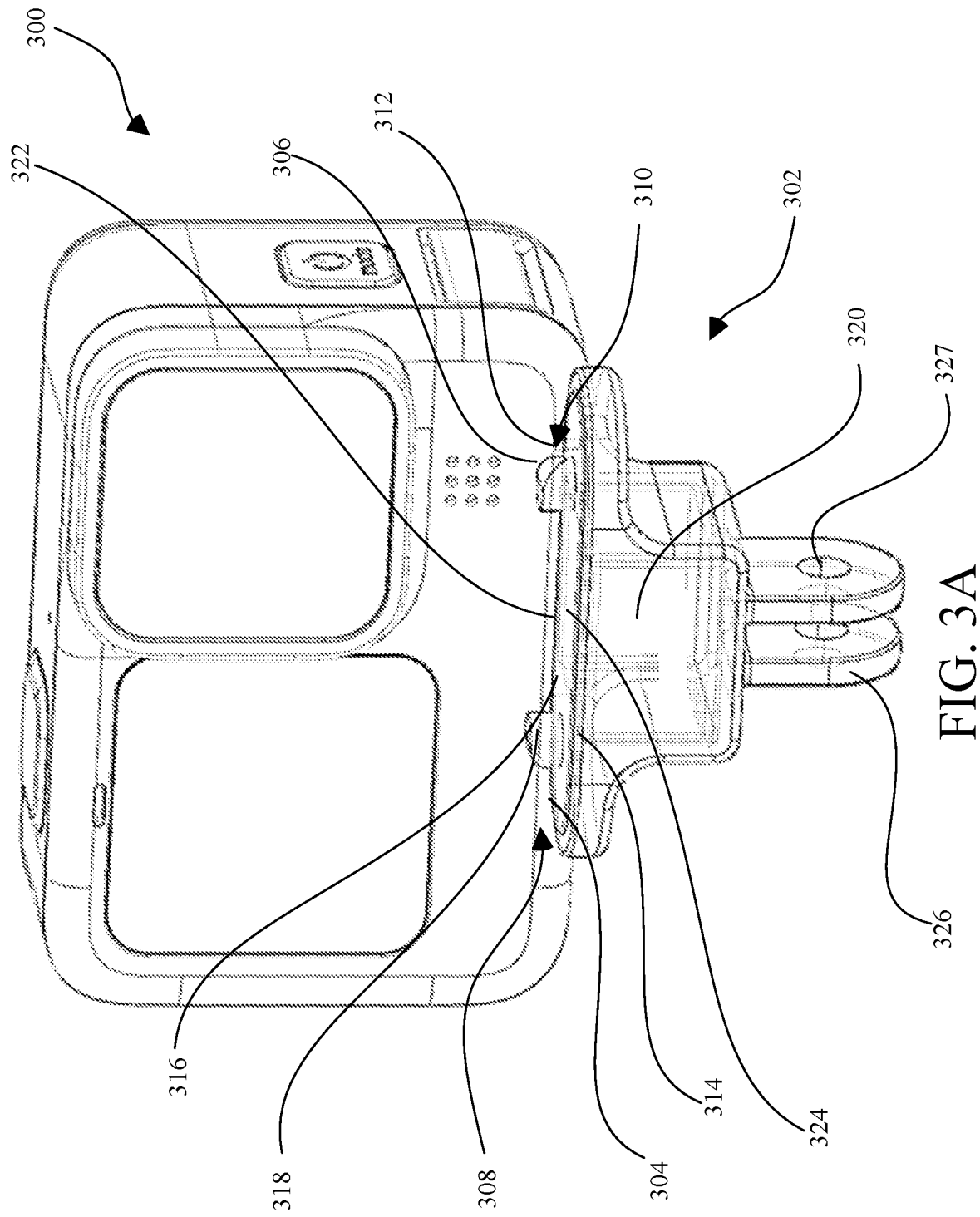
FIG. 3A is a partially transparent isometric view of a camera and a camera mount.

FIG. 3A is a partially transparent isometric view of a camera 300 connected to a camera mount 302. The camera 300 includes a camera interconnect mechanism 304 including recesses 306 therein.

The camera interconnect mechanism 304 functions to connect the camera 300 to one or more support devices and/or camera mounts such as the camera mount 302. The camera interconnect mechanism 304 may pivot. The camera interconnect mechanism 304 may fold. The camera interconnect mechanism 304, when in the stowed position 308, may form a planar surface or a support of the camera 300. The camera interconnect mechanism 304 may be movable between an extended connection position (not shown) where the camera interconnect mechanism 304 extends out of the camera 300 to expose the recesses 306 and a stowed position 308 (as shown) where the camera interconnect mechanism 304 is located within a body or depression of the camera 300 so that the recesses 306 are not accessible.

The recesses 306 may function to assist in connecting the camera 300 to another structure such as a dashboard, windshield, gimbal, bicycle, helmet, or a combination thereof. The recesses 306 may prevent the camera from being removed from the other structure and/or camera mount (not shown). The recesses 306 may be a depression (e.g., a hole with only one opening) that receives a portion of the camera mount 302. The recesses 306 may be a through hole. The recesses 306 may receive a rigid member that extends into the recesses 306 in the camera 300 to form a connection with the camera mount 302. The camera 300 may include the interconnect mechanism 304 with the recesses 306, and the camera mount 302 may also include recesses 327 configured to receive a pin, a threaded member, a bolt, a fastener, a cotter pin, a nail, or a combination thereof so that the camera mount 302 fixedly attaches to a support device. The recesses 306 of the interconnect mechanism 304 in the connection position may be axially aligned, extend parallel, or both. The recesses 306 may be configured to receive pins 310 of the camera mount 302 as shown.

The pins 310 may prevent the camera mount 302 from being moved in a shear direction or a parallel direction with respect to a side, surface, or plane of the camera 300. The pins 310 may extend into the recesses 306 to prevent the camera 300 from sliding in a direction parallel to the camera mount 302 or a direction substantially perpendicular to an axis of the pins 310 (e.g., 15 degrees or less, 10 degrees or less, or 5 degrees or less relative to a perpendicular direction). The pins 310 may prevent the camera 300 and the camera mount 302 from moving in any direction other than along an axis of the pins 310. The pins 310 may prevent the camera 300 from rotating relative to the camera mount 302. For example, the pins 310 may contact an inner wall 312 of the camera 300 and/or the recesses 306 so that the camera 300 is prevented from tipping relative to the camera mount 302. In another example, if a user tips the camera 300 so that the camera 300 is positioned at a 45-degree angle to vertical or horizontal, the pins 310 may prevent the camera 300 from rotating away from the camera mount 302 on a first side 314 of the pins 310 while remaining in contact with the camera mount 302 on a second side 316 of the pins 310. The pins 310 may be pyramidal, cone-like, or cylindrical in shape (as shown).

The pins 310 may have a shape that is configured to facilitate the pins 310 in extending into the recesses 306. The pins 310 may have a flat and/or planar surface (e.g., a terminal end may be flat or planar). The pins 310 may have a chamfered surface 318. The chamfered surface 318 may extend downward from a forward end and/or terminal end of the pins 310. The chamfered surface 318 may be flat, rounded, angled, curved, or a combination thereof. The chamfered surface 318 on a first of the pins 310 may be located on a same or an opposite side as a chamfered surface 318 on a second of the pins 310. For example, the chamfered surfaces 318 may be located on all exterior sides of the pins 310, on all interior sides of the pins 310, on some exterior sides and some interior sides, or a combination thereof. The chamfered surface 318 may contact a wall of the recesses 306 and assist in moving the pins 310 into the recesses 306. The chamfered surface 318 may assist in seating a magnet 320 of the camera mount 302 against a magnetic portion 322 of the camera 300.

The magnet 320 of the camera mount 302 may be partially or entirely located within the camera mount 302. The magnet 320 may be free of a cover or an outer surface. The magnet 320 may be covered by an outer surface 324. The outer surface 324 extends over the one or more magnets 320 so that the one or more magnets 320 are enclosed within the camera mount 302. The magnet 320 may be made of or include a ferrous material, a rare earth material, iron, nickel, cobalt, neodymium, samarium, or a combination thereof. The magnet 320 may have a holding strength of about one Kg or more, two Kg or more, five Kg or more, even about ten Kg or more, about 100 Kg or less, or about 50 Kg or less. The holding strength of the magnet 320 in an axial direction (e.g., a perpendicular direction to a side of the camera mount 302) may be greater than a holding strength in a shear direction (e.g., a direction parallel the side of the camera mount 302). The holding strength of the magnet 320 may be dependent upon a material, size, orientation, or a combination thereof of the magnetic portion 322 of the camera 300.

The magnetic portion 322 of the camera 300 may be a metallic portion of the camera 300, a portion of a housing of the camera 300, the camera interconnect mechanism 136 (shown in FIG. 1B), a portion of the camera interconnect mechanism 304 of the camera 300, or a combination thereof. The magnetic portion 322 may include one of the materials discussed above with regard to the magnets 320. The magnetic portion 322 may include iron, nickel, cobalt, or a combination thereof. The magnetic portion 322 may include magnets behind the camera interconnect mechanism 304, on another surface so that a magnetic field may attract the magnet 320 to form a connection. The magnetic portion 322 may be a surface located between portions of the camera interconnect mechanism 304 that the camera interconnect mechanism 304 connects to, rotates about, or both. The magnetic portion 322 may be centrally located between the camera interconnect mechanism 304. The magnetic portion 322 of the camera mount 302 may be located on or adjacent to a surface that opposes a mount interconnect mechanism 326 that includes recesses 327 so that the camera 300 and the camera mount 302 connect together (e.g., located directly opposite).

The mount interconnect mechanism 326 functions to connect the camera mount 302 to a support structure, another camera mount, a separate device, or a combination thereof. The mount interconnect mechanism 326 may removably mount the camera mount 302 to a structure. The mount interconnect mechanism 326 may be fixed. The mount interconnect mechanism 326 may be movable, stowable, foldable, or a combination thereof. The mount interconnect mechanism 326 may form a rigid connection to another device and the magnets 320 may releasably connect the camera 300 to the camera mount 302.

FIG. 3B is a partially transparent isometric view of the camera mount 302 of FIG. 3A. The camera mount 302 includes pins 310 that extend axially outward from the camera mount 302. The pins 310 include a chamfered surface 318 to facilitate installation within a recess 306 of a camera (such as the camera 300 shown in FIG. 3A) or a recesses 327 of the camera mount 302. The magnet 320 as shown is an oversized magnet 320. The magnet 320 has a height (H) that is substantially a same height as the height of a body 328 of the camera mount 302. The body 328 houses the entire magnet 320. The magnet 320 is located within the camera mount 302 and covered by an outer surface 324.

The outer surface 324 is sufficiently thin so that the outer surface 324 does not interfere with forming a magnetic connection. The outer surface 324 seals the magnet 320 from an environment, prevents debris from collecting on the magnet, or both. The outer surface 324 may be made of or include plastic, a polymer, a polycarbonate (PC), polymethyl methacrylate (PMMA), polyethylene (PE), polypropylene (PP), polyethylene terephthalate (PETE), polyvinyl chloride (PVC), acrylonitrile-butadiene-styrene (ABS) rubber, or an elastomer. The outer surface 324 may be a non-slip surface, a high friction surface, or both. The outer surface 324 may include pins 310. The pins 310 may be a monolithic part of the outer surface 324. The outer surface 324 may include rubber or silicone that prevents the camera from moving along the outer surface. The outer surface 324 may have a coefficient of friction of about 0.5 or more, about 0.6 or more, about 0.75 or more, or about 0.8 or more. The outer surface 324 may have a coefficient of friction of about 1.5 or less, about 1.2 or less, or about 1 or less. The outer surface 324 may lock the magnet 320 within the body 328 so that the magnet 320 cannot be removed from the body 328.

FIG. 3C is a partially transparent side view of the camera mount 302 of FIGS. 3A-3B. The pins 310 are shown extending outward from the camera mount 302. Opposing outer edges of the pins 310 include chamfered surfaces 318 to assist the pins 310 extending into the recesses 306 shown in FIG. 3A.

The pins 310 extend outward from the magnet 320 and through the outer surface 324. The pins 310 may be part of the outer surface 324. The outer surface 324 extends above the body 328 and the magnet 320. The outer surface 324 may fit within a cavity in the camera 300 to further assist in forming a connection between the camera 300 and the camera mount 302. The height (H) of the magnet 320 and the body 328 are substantially the same such that the magnet 320 substantially fills the body 328.

Figure 4A:
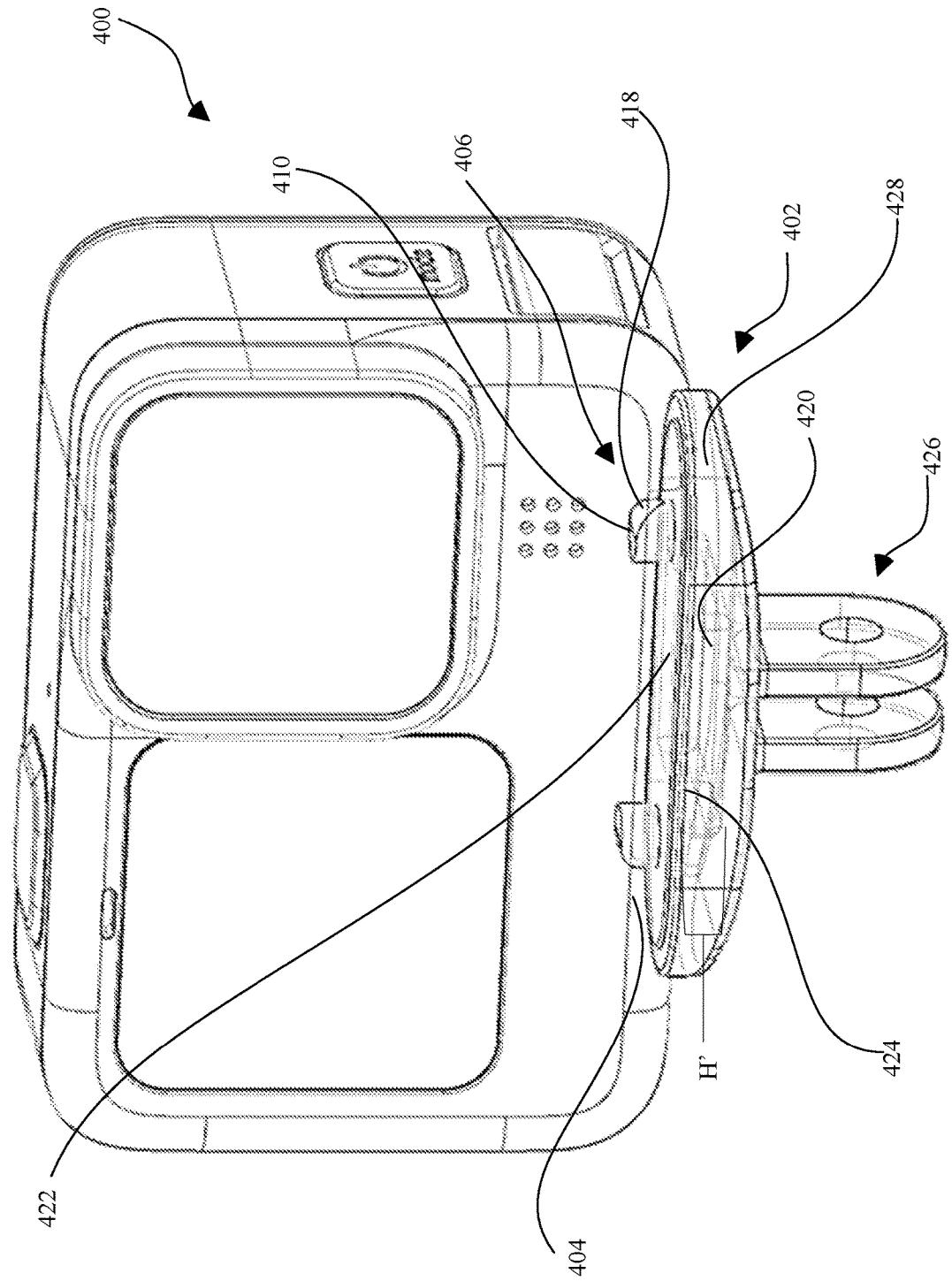
FIG. 4A is a partially transparent isometric view of a camera and a camera mount.

FIG. 4A is a partially transparent isometric view of a camera 400 connected to a camera mount 402, which has a low profile. The camera 400 includes a camera interconnect mechanism 404 with recesses 406 that receive pins 410 of the camera mount 402. The pins 410 include chamfered 418 surfaces that assist in forming a connection between the camera mount 402 and the camera 300. As the pins 410 extend into the recesses 406 the magnet 420 attracts the camera mount 402 to a magnetic portion 422 of the camera 400.

The magnet 420 may be located within the camera 400, the camera mount 402, or both. The magnetic portion 422 may be part of the camera 400, the camera mount 402, or both. The magnet 420 is covered by an outer surface 424 that covers and protects the magnet 420. The camera mount 402 may include a mount interconnect mechanism 426 that assists in connecting the camera mount 402 to another support structure as discussed herein. The magnet 420 may be sandwiched between the outer surface 424 and the mount interconnect mechanism 426.

The magnet 420 is located within a body 428. The magnet 420 has a height (H') that substantially fills the body 428. The height H' is associated with a low profile and is a height that is less than a height H associated with the camera mount 302 of FIGS. 3B-3C. The height H may have a height that is about 1.5× or more, about 2× or more, about 3× or more, or about 4× or more than that of H'. The height of H' may be about one mm or more, two mm or more, three mm or more, four mm or more. The height of H' may be about five cm or less, about four cm or less, about three cm or less, about two cm or less, or about one cm or less.

Figure 4B:
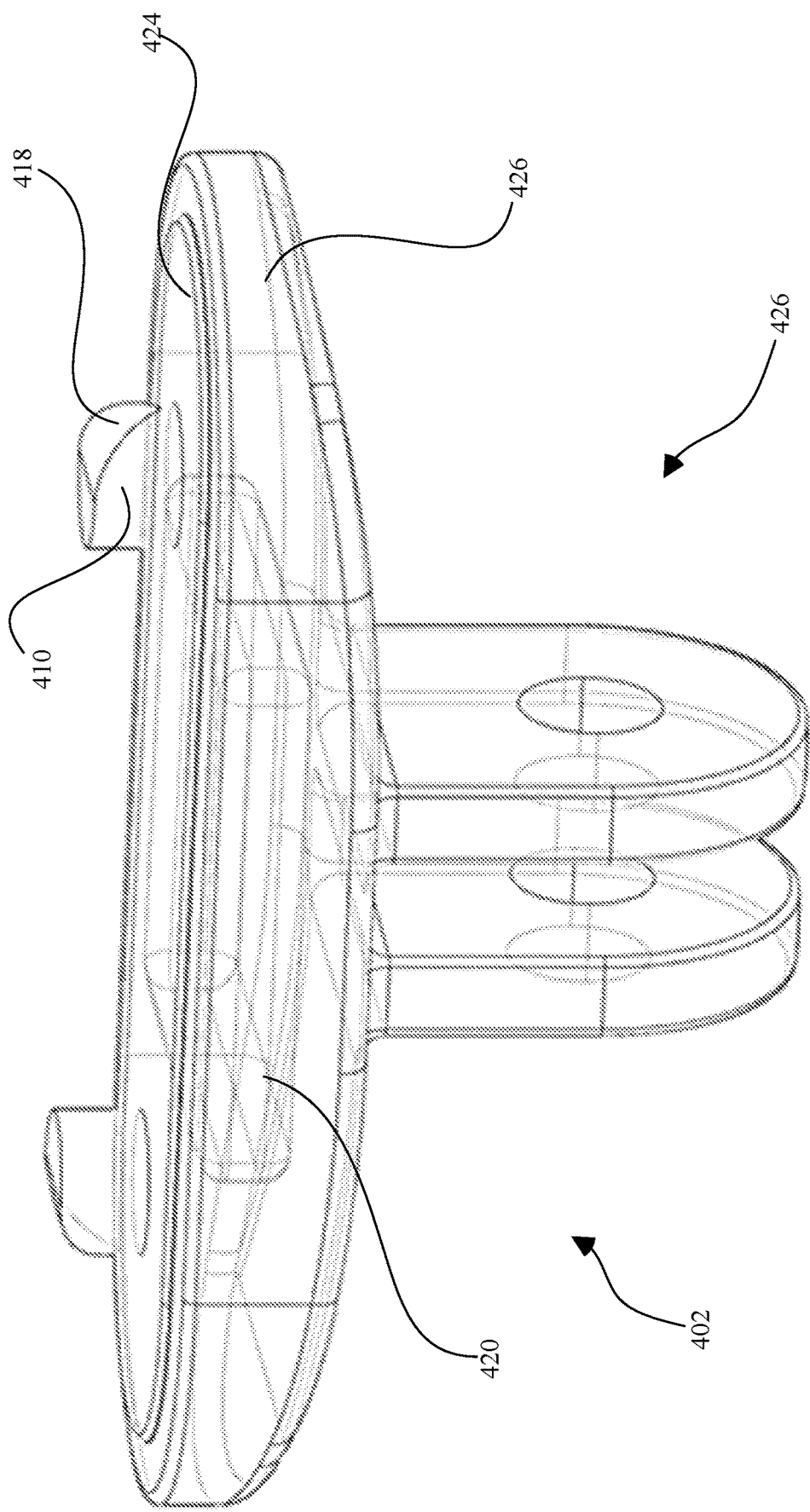
FIG. 4B is a partially transparent isometric view of the camera mount of FIG. 4A.

FIG. 4B is a partially transparent close-up isometric view of the camera mount 402 of FIG. 4A. The camera mount 402 is shown in transparent so that the magnet 420 is shown within the body 428. The magnet 420 has the height (H') that is a low profile height compared to the magnet 320 of FIGS. 3A-3C.

Figure 5:
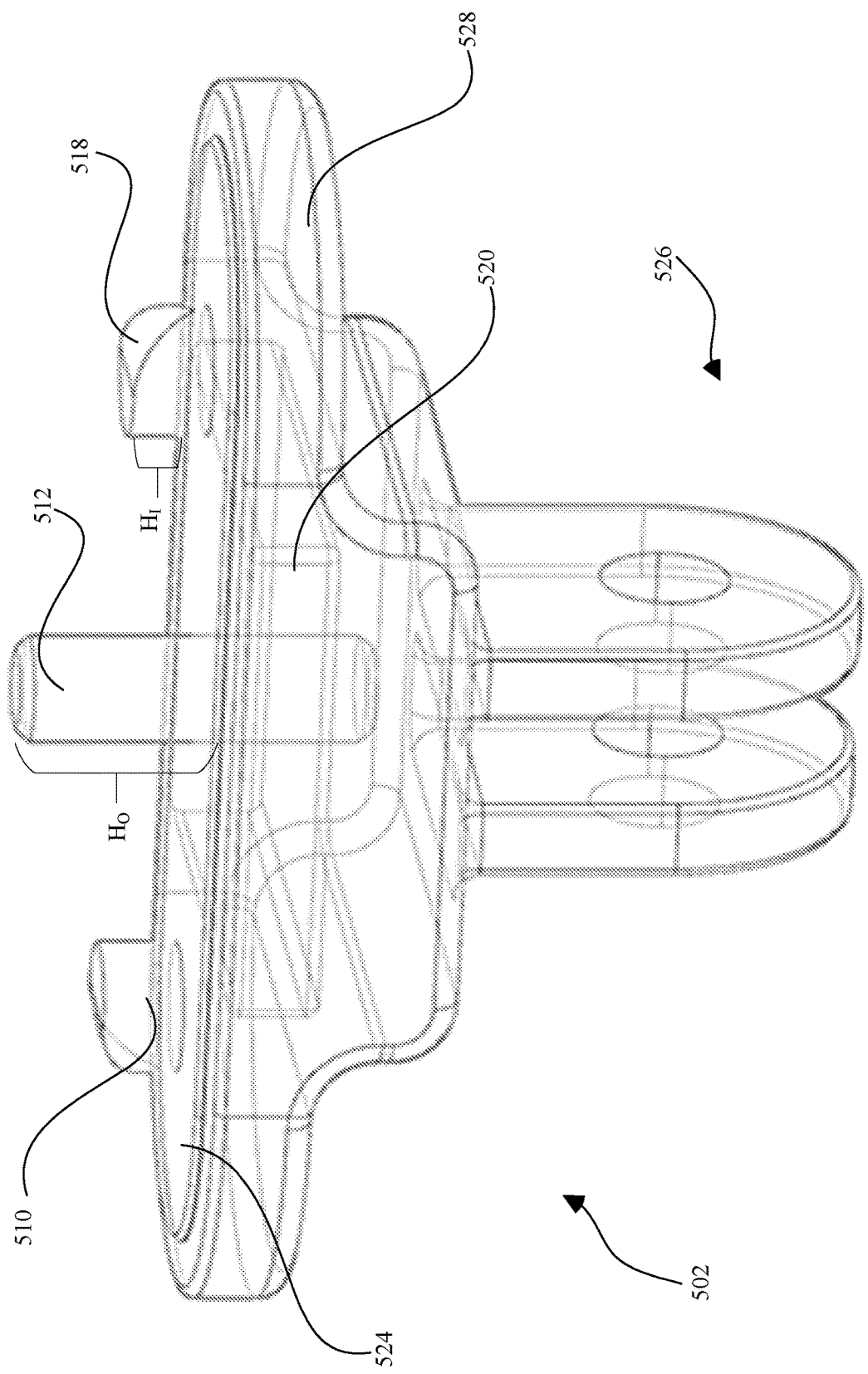
FIG. 5 is a partially transparent isometric view of a camera mount including three posts.

FIG. 5 is a partially transparent close-up isometric view of a camera mount 502. The camera mount 502 includes a pair of pins 510 and one or more post 512 extending between the pins 510. The posts 512 has a height (Ho) that is greater than a height (Hi) of the pins 510. The posts 512 may be a singular post 512 or two or more posts 512. The post 512 may have a height (Ho) that is about 1.2× or more, about 1.5× or more, about 2× or more, about 3× or more about, 10× or less, about 7× or less, or about 5× or less the height (Hi) of the pins 510. The post 512 prevents tipping of the camera mount 502 relative to the cameras 100, 200, 300, or 400 shown in FIGS. 1A-1B, 3A, and 4A. The post 512 extends into the camera (not shown) a sufficient distance so that when a user tips the camera downward the camera is prevented from angling away from the camera mount 502. The posts 512 may extend into the camera a distance so that when the camera is moved from a vertical position towards a horizontal distance the post 512 contacts an internal wall of the camera (not shown) to prevent the camera and the camera mount 502 from disengaging. The post 512 similar to the pins 510 prevents the camera (not shown) form moving in a shear direction relative to the camera mount 502.

The pins 510 include a chamfered surface 518 to facilitate forming a connection between the camera mount 502 and the camera shown in FIGS. 1A-1B, 3A, and 4A.

The post 512, as shown, extends through a magnet 520. However, the post 512 may extend along a side of the magnet 520 or adjacent to the magnet 520. The post 512 may be located entirely above the magnet 520 and may extend from an outer surface 524 that covers the magnet 520. The post 512 may be a magnet, a magnetic metal, or both. The post 512 may transfer magnetism from the magnet 520. The post 512 may be made of a plastic or polymer discussed herein regarding the outer surface 524. The outer surface 524 may extend along a top of the camera mount 502 and mount interconnect mechanism 526 may extend from a bottom surface of the camera mount 502.

The mount interconnect mechanism 526 connects the camera (not shown) and the camera mount 502 to another structure so that the camera mount 502 is fixedly connected but the camera may be rapidly removed. The mount interconnect mechanism 526 may extend outward from a body 528 that houses the magnet 520. The post 512 may extend into the body 528 so that the post 512 forms a rigid connection with the camera mount 502. The post 512 may have a height of about one mm or more, about three mm or more, about five mm or more, about seven mm or more, or about one cm or more. The post 512 may have a height of about ten cm or less, about seven cm or less, about five cm or less, or about three cm or less.

Figure 6:
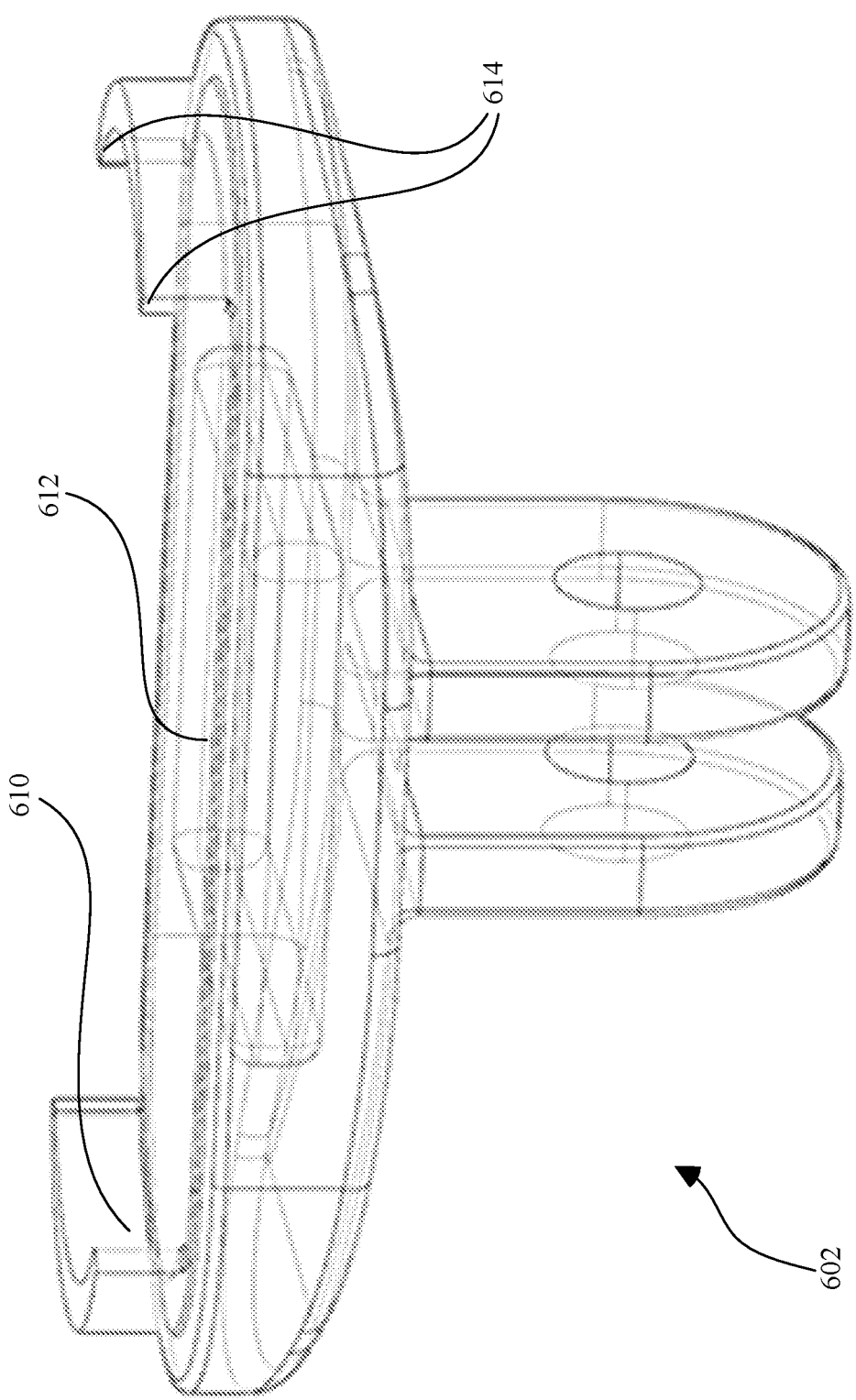
FIG. 6 is a partially transparent isometric view of a camera mount including posts at opposing ends.

FIG. 6 is a partially transparent isometric view of a camera mount 602 shown in transparent. The camera mount is substantially identical to the camera mounts taught in FIGS. 3A-5 except for a pin 610 design. The one or more pins 610 may be configured to extend into the interconnect recesses 140 such as those of FIG. 1B. The pins 610 may be complementary in shape to a shape of the interconnect recesses 140. The pins 610 may be crescent shaped, half circular, "U" shaped, "C" shaped, a generally round shape, or a combination thereof. The pins 610 may restrict movement of the image capture device 100, 200, 300, 400 of FIGS. 1A-2, 3A, and 4A.

The pins 610 may prevent the camera (not shown) from shearing off of the camera mount 602. For example, the pins 610 may prevent the camera from moving parallel to the camera mount 602 such that the camera slides off of the camera mount 602 (e.g., in a lateral direction, a longitudinal direction, twisting, and/or shearing). The pins 610 may prevent tipping of the camera relative to a plane 612 of the camera mount 602. Thus, if the camera mount 602 is leaned downward towards the ground, the pins 610 may restrict a side of the camera from pulling way from the camera mount 602 so that contact is maintained between the camera (not shown) and the camera mount 602. For example, as the camera (not shown) begins to pull away from camera mount 602, a tip 614 of the pins 610 may contact the interconnect recesses 140 and prevent the camera in tipping away from the camera mount 602.

FIG. 7A is a partially transparent isometric view of a camera 700 connected to a camera mount 702 and FIG. 7B illustrates a partially transparent isometric view of only the camera mount 702. The camera 700 includes a camera interconnect mechanism 704 having recesses 706 that are accessible in a stowed position 708 by pins 710 of the camera mount 702, all of which connect in a same manner as discussed herein regarding FIGS. 3A-6. The camera mount 702 includes one or more trays 712 that extend around the pins 710.

The trays 712 extend along a first side 714 of the pins 710 and a second side 716 of the pins 710. The trays 712 may extend outward from an edge of the camera mount 702. An edge of the camera mount 702 may be a terminal portion of a side of the camera mount 702. For example, an edge may be a portion of a side of the camera mount 702 where the side ends. The trays 712 prevent rotation of the camera 700 towards the first side 714 and towards the second side 716 so that when the camera 700 is angled downward the camera 700 does not tip relative to the camera mount 702. The trays 712 assist magnets 720 in maintaining contact with a magnetic portion 722 regarding of an orientation of the camera 700 and the camera mount 702. The trays 712 may restrict a shear movement towards the first side 714 in a first direction and towards a second side 715 in a second direction and may prevent the camera 700 from tipping towards the first side 714 and the second side 716.

The trays 712 may extend outward from a body 728 of the camera mount 702. The trays 712 and body 728 may form a "U" shape or a "C" shape. The trays 712 may extend along two opposing sides of the pins 710.

FIG. 8A is a partially transparent isometric view of a camera 800 connected to a camera mount 802 and FIG. 8B illustrates a partially transparent isometric view of the camera mount 802. The camera mount 802 includes trays 812 that form a periphery substantially around the camera 800 when the camera 800 is connected to the camera mount 802 via magnets 820. The magnets 820 of the camera mount 802 connect to one or more magnetic portions 822 of the camera 800 while the trays 812 assist in maintaining the magnetic connection. The trays 812 restrict a shearing motion of the camera 800 relative to the camera mount 802. The trays 812 extend fully or partially along all four sides of the camera 800 such that the camera 800 is prevented from sliding in a first direction, second direction, third direction, a fourth direction, or a combination thereof (e.g., forward, backward, left, or right) relative to the camera mount 802.

The trays 812 form a periphery around the camera mount 802, the camera, or both. The trays 812 may have a height that is sufficient to prevent sliding, tipping, or both of the camera 300 relative to the camera mount 802. For example, if the camera 800 is angled downwards towards the ground, a forward wall 824 of the camera 800 contacts the tray to prevent movement of the magnetic portion 822 relative to the magnet 820.

The tray 812 may have a height that is greater relative to a forward wall 824 and a rearward wall 826 than opposing side walls 828 of the camera 800. The tray 812 may be used with pins (e.g., 310, 410, 510, or 610) or may be free of pins. The trays 812 may negate a need for pins to form a connection between the camera 800 and the camera mount 802. Thus, the camera mount 802 may be free of pins. The trays 812 may prevent movement of the camera 800 relative to the camera mount 802 in any direction other than normal to the camera mount 802. Stated another way, the camera 800 may only be vertically removed from the camera mount 802.

Figures 9A, 9B:
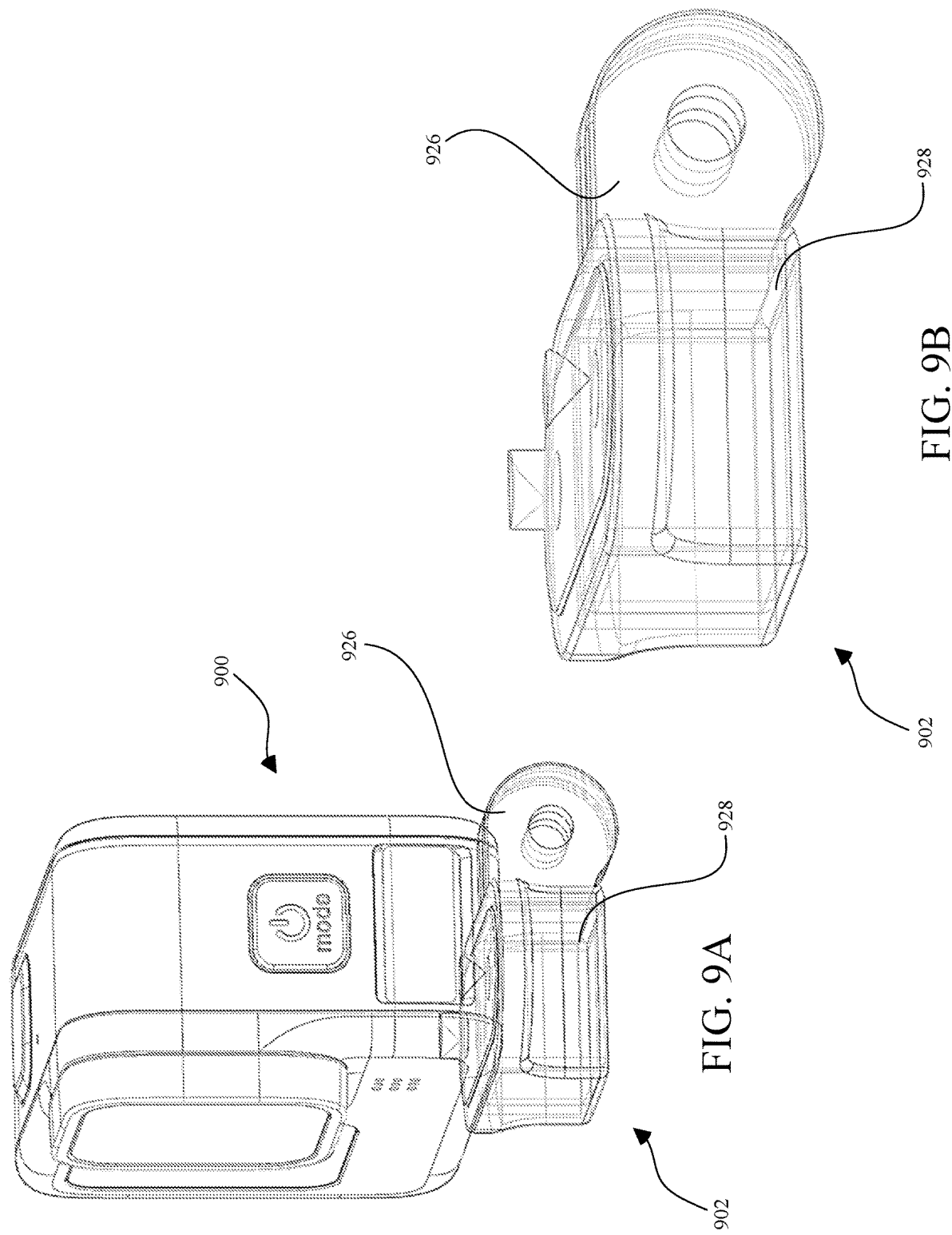
FIG. 9A is a partially transparent isometric view of a camera and a camera mount.
FIG. 9B is a partially transparent isometric view of the camera mount of FIG. 9A.

FIG. 9A is a partially transparent isometric view of a camera 900 connected to a camera mount 902 and FIG. 9B is a partially transparent isometric view of the camera mount 902. The camera 900 and camera mount 902 form a connection in a same manner as shown and described in FIGS. 3A-4B. The camera mount 902 includes a mount interconnect mechanism 926 that extends from a body 928 in a direction adjacent to the camera 900.

The mount interconnect mechanism 926 extending from a rear wall of the camera mount 902 may assist in the camera 900 in being connected to surfaces and/or devices where a bottom connection is not possible or a bottom connection may restrict an ability to detect and record images. For example, the mount interconnect mechanism 926 may assist the camera in being angled downward towards the ground.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A camera mount, comprising:
a body;
one or more magnets located within the body and configured to connect to a magnetic portion or a ferromagnetic portion of a camera; and
two pins that extend axially outward from the body above the one or more magnets and are configured to extend into recesses within the camera, wherein the one or more magnets are located between the two pins.

2. The camera mount of claim 1, wherein the one or more pins include a chamfered surface that assist the one or more pins into extending into the recesses within the camera.

3. The camera mount of claim 1, wherein the one or more pins are substantially cylindrical in shape and a recess, that that is configured to receive one of the one or more pins, is complementary in shape to the one or more pins.

4. The camera mount of claim 3, further comprising a post that extends axially outward from the body, wherein the post is located between the two pins.

5. The camera mount of claim 1, wherein the one or more pins have a crescent shape and the recesses in the camera are interconnect recesses that receive the one or more pins.

6. The camera mount of claim 1, further comprising an outer surface that extends over the one or more magnets so that the one or more magnets are enclosed within the body.

7. A camera mount, comprising:
a body:
one or more magnets located within the body and configured to connect to a magnetic portion or a ferromagnetic portion of a camera;
one or more pins that extend axially outward from the body above the one or more magnets and are configured to extend into recesses within the camera; and
trays located on opposing edges of the camera mount.

8. The camera mount of claim 7, wherein the one or more pins are two pins and the one or more magnets are located between the two pins.

9. The camera mount of claim 7, wherein the one or more pins are located between the trays located on the opposing edges of the camera mount.

10. The camera mount of claim 7, wherein the trays extend along a first longitudinal edge and a second longitudinal edge of the camera mount.

11. The camera mount of claim 7, wherein the trays prevent rotation of the camera relative to the camera mount when the camera is connected to the camera mount.

12. The camera mount of claim 7, wherein they trays prevent rotation of the camera when the camera mount and camera are rotated at a downward angle.

13. The camera mount of claim 7, wherein the trays restrict a shear movement towards a first edge, a second edge, or both.

14. The camera mount of claim 13, wherein the trays and the body form a "U" shape or a "C" shape.

15. A camera mount comprising:

a body;

one or more magnets located partially or entirely within the body and configured to connect the camera mount to a camera; and an outer surface extending between the magnets and the camera, the outer surface configured to prevent the magnets from disconnecting from the camera when a shear force is generated against the camera mount or the camera, wherein the outer surface has a coefficient of friction that resists the camera from moving relative to the camera mount.

16. The camera mount of claim 15, wherein the coefficient of friction is about 0.75 or more.

17. The camera mount of claim 15, further comprising trays that extend from two or more edges of the camera mount and prevent movement of the camera to prevent tipping of the camera relative to the trays.

18. The camera mount of claim 17, wherein the trays extend at least partially along all four edges of the camera mount and the trays are configured to fit the camera within a void/recess formed by the trays.

19. The camera mount of claim 15, further comprising pins that extend axially away from the body through the outer surface into a portion of the camera.

20. The camera mount of claim 15, further comprising:

two pins located on opposing sides and the one or more magnets are located between the two pins.

* * * * *